Jan. 23, 1968  V. PFEFFER  3,364,672
ARRANGEMENT FOR STABILIZING THE FREQUENCY OF
ELECTRIC LOW FREQUENCY OSCILLATORS
Filed Aug. 18, 1965  5 Sheets-Sheet 1

INVENTOR.
Václav Pfeffer
BY

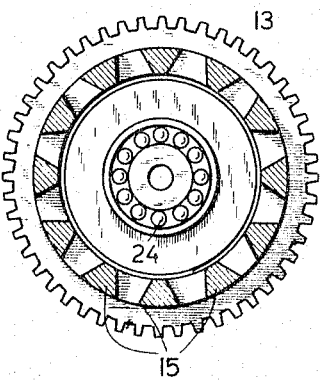
Fig. 2.
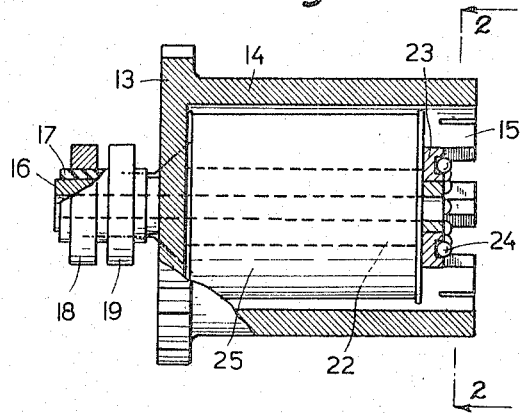
Fig. 3.
Fig. 5.
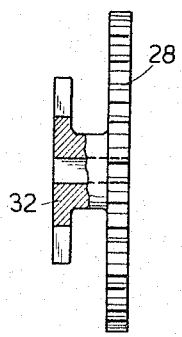
Fig. 4.
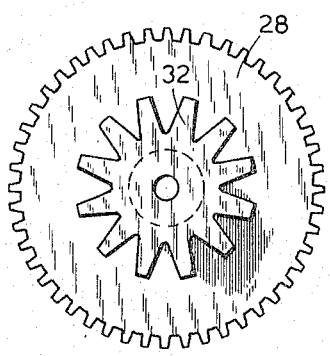
Fig. 6.
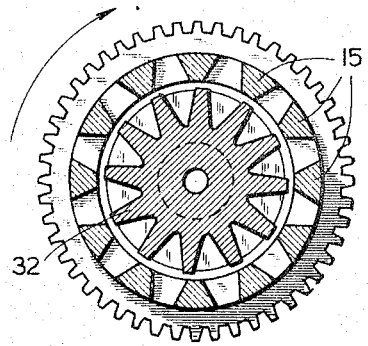

Jan. 23, 1968   V. PFEFFER   3,364,672
ARRANGEMENT FOR STABILIZING THE FREQUENCY OF
ELECTRIC LOW FREQUENCY OSCILLATORS
Filed Aug. 18, 1965   5 Sheets-Sheet 5

INVENTOR.
Václav Pfeffer
BY
Richard Low
Ag't

United States Patent Office 3,364,672
Patented Jan. 23, 1968

3,364,672
ARRANGEMENT FOR STABILIZING THE FREQUENCY OF ELECTRIC LOW FREQUENCY OSCILLATORS
Václav Pfeffer, Prague, Czechoslovakia, assignor to Laboratorní Pristroje, národní podnik, Prague, Czechoslovakia
Filed Aug. 18, 1965, Ser. No. 480,707
Claims priority, application Czechoslovakia, Aug. 29, 1964, 4,841/64, 4,842/64
9 Claims. (Cl. 58—24)

This invention relates to a method and an arrangement for stabilizing the frequency of simple low frequency electrical oscillators. Such oscillators have been neglected and have been unused due to their great frequency instability.

It is an object of this invention to provide an inexpensive, but completely reliable low frequency oscillator, which under the control of a regulator may drive both a master clock and subsidiary clock systems. The system functions on the principle of pulse or frequency control.

The outstanding properties of known mechanical oscillators for the control of clock works are a result of their theoretical and practical development in the course of years and of their physical properties. The time control unit known as an "escapement" is a tiny device with perfect temperature compensation, which functions to neutralize perfectly the influence on the clock mechanism of its surroundings. The simplicity of the escapement insures a high degree of reliability and its easy regulation permits optimum adjustment of the accuracy of the clock mechanism without interrupting the movement thereof. A negligible ageing is an important factor for time measurements extending for long periods. A serious drawback is, however, the intermittent movement and the low torque, which can be derived from the escapement, if the isochronism should not be affected. The balance wheel and the pendulum cannot therefore be used for the control of the movement of modern clock systems, the hands of which must show the time not only at intervals of minutes, half minutes, or seconds, but still more frequently by a perfectly continuous movement. The simple classical mechanical oscillators cannot be replaced by costly electrical oscillators, which require for the achievement of an equivalent accuracy expensive stabilization apparatus and must be maintained at constant temperatures. The thermostatic devices and the necessary high frequency dividers increase the cost to a point at which it is completely unfeasible for the control of the movement of master clocks.

It is proposed in the British Patent 1,020,040 that the unstable frequencies of simple and inexpensive electrical oscillators be stabilized by systematic regulation based upon cooperation with a clock escapement which represents a time base for comparison. A drawback of this arrangement is the determination of frequency deviations by means of a differential. The low efficiency of a planet gear system is negligible only when the excess of driving force is independent of variable mechanical resistances. Such low efficiency is not acceptable, however, in the transmission of small torques to a sensitive escapement of the balance wheels, the movement of which is affected by variation of the driving force. Thus, the use of a differential depreciates the comparative time base and also the accuracy of the whole arrangement. An additional drawback is the half angle of deviation of the common wheel with respect to the angle of deviation of both front wheels of the differential, indicating the extent and character of the frequency deviations. Thus, the sensitivity of the proper regulation is substantially reduced. Furthermore, there is a necessity of deviations for the common wheel in opposite directions, which is an essential feature of the differential gear. Its consequence is a play in the teeth which cannot be eliminated and which suppresses the indication of small frequency deviations. These drawbacks are emphasized in operation. The differential gear is therefore not sufficiently mobile for the required quick indications and simultaneous suppression of frequency fluctuations of simple oscillating circuits.

In accordance with the present invention, these aforementioned drawbacks of the frequency stabilization of electrical low frequency oscillators are eliminated. This is accomplished by transmitting the mechanical movement of the time base is also transmitted. Thus, quency oscillator, in the same direction to two elements of a magnetic circuit. The mechanical movement is transmitted to one element directly. The mechanical movement is transmitted to the second element to which the regular movement of the time base is also transmitted. Thus variations of the flow of lines of magnetic force produced by each commencement of a deviation produce variations of inductivity of a tuned circuit, which assists in suppressing the variations of the fundamental frequency of the oscillator.

The apparatus of the present invention includes a rotating coil in a magnetic casing driven by the oscillator. An axial extension of the casing cooperates with which the radial arms of a spoked wheel spaced from the extension by an air gap. A synchronous motor drives both elements in the same direction, one element being driven directly and the other element being driven by an elastic clutch under simultaneous control by an escapement.

This arrangement of the present invention thus utilizes not only an inexpensive low frequency oscillator, but further includes apparatus for remote and advantageous control of its time base to regulate its movement with accuracy, so that the entire arrangement may function as a master clock. The apparatus is provided with a pair of levers which are electromagnetically varied in positions as tongues in order to control the regulating lever of the balance wheel of the escapement, which normally varies the operating length of the balance spring of said escapement in accordance with a control time signal. The levers clamp between them a bolt fixed on a rotating disc driven by a synchronous motor energized by the low frequency oscillator and thereby deviate the regulating lever in a direction determined by the actual position of the movable bolt at the instant of application of the time signal.

In order that the present invention may be readily carried into effect, it will now be described with reference to the accompanying drawings, wherein:

FIG. 2 is a view taken along the lines 2—2 of FIG. 3;

FIG. 3 is a view, partly in section, of the principal component of the apparatus of FIG. 1;

FIG. 4 is an axial view of a component which cooperates with the component of FIGS. 2 and 3;

FIG. 5 is a view, partly in section, of the component of FIG. 4;

FIG. 6 is a view, partly in section, of the components of FIGS. 2 and 4 in cooperative relation;

Figure 1:
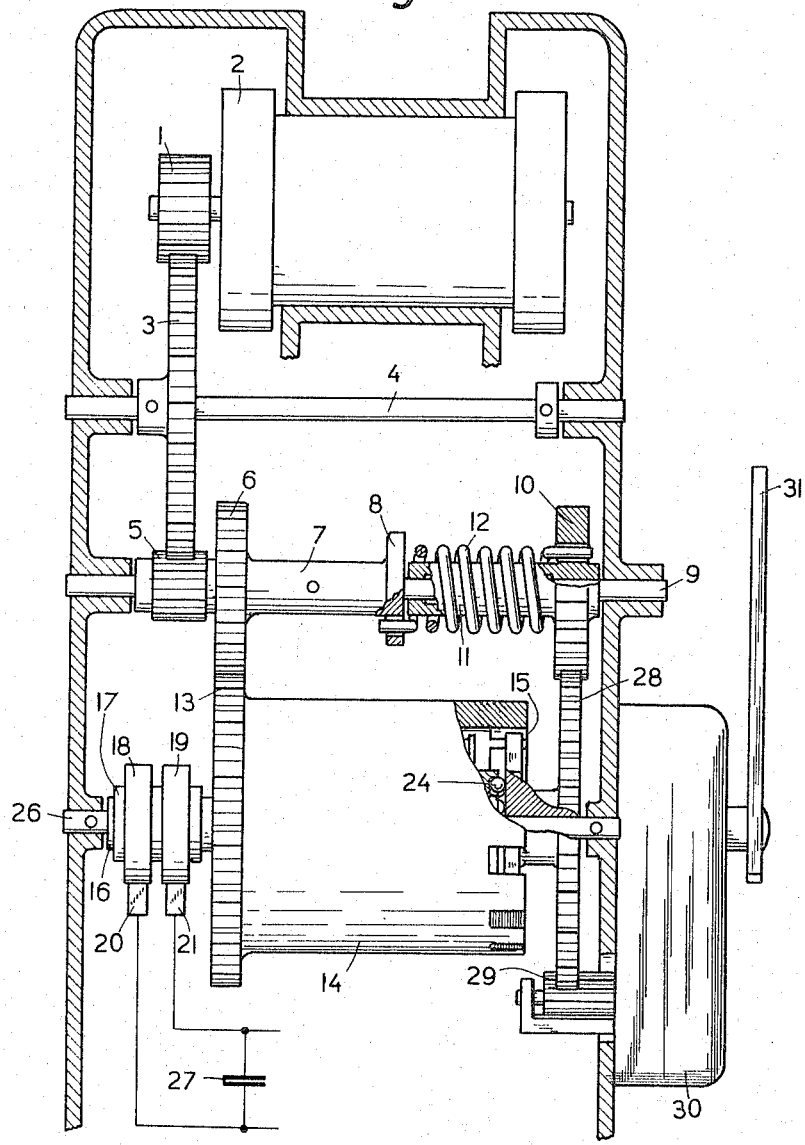
FIG. 1 is a schematic diagram partly in section of an embodiment of the apparatus of the present invention.
Figure 7:
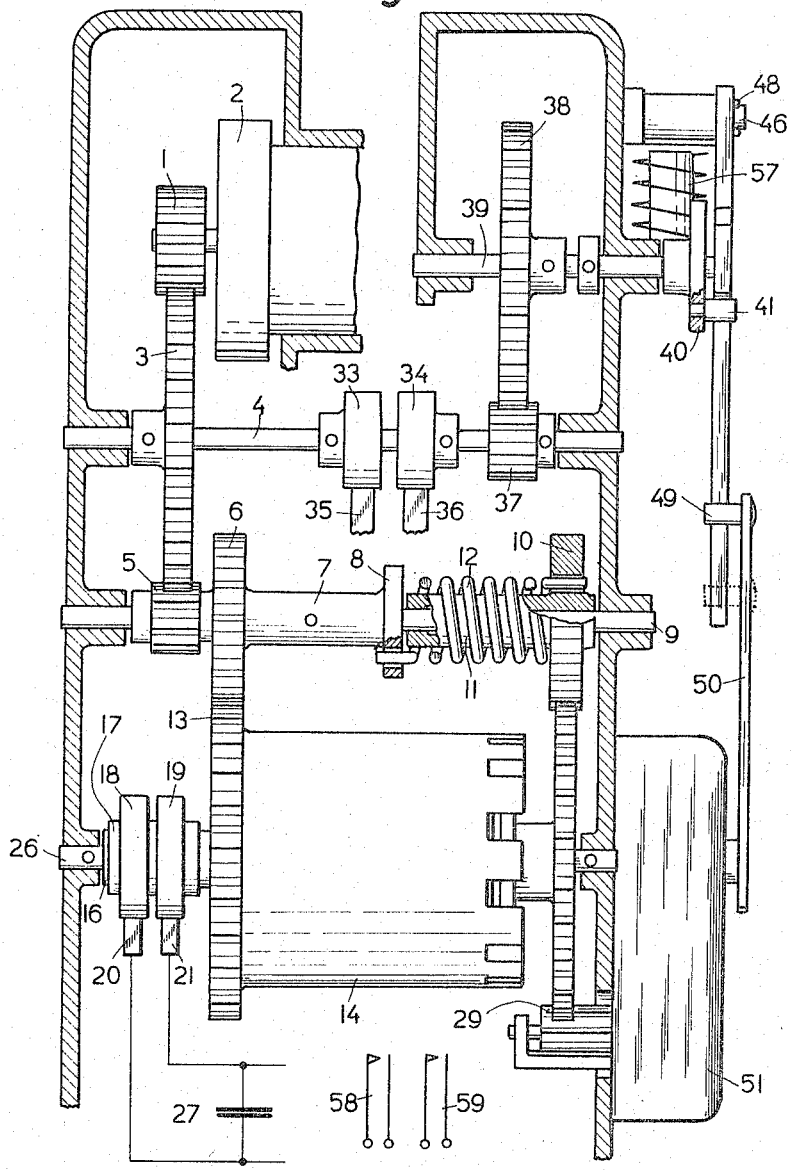
FIG. 7 is a view, partly in section, of a modification of the embodiment of FIG. 1.

In FIGS. 1 and 7, the pinion 1 of the synchronous motor 2 meshes with the toothed wheel 3 fixed on the auxiliary shaft 4. The toothed wheel 3 engages with the pinion 5, which is part of the toothed wheel 6. The hub 7 of the toothed wheel 6 extends into a disc 8. The units 5, 6, 7, 8 are fixed on the intermediate shaft 9 which also supports a toothed wheel 10 on its hub 11. The disc 8 and the toothed wheel 10 are linked by a helical spring 12 which is loosely coaxially mounted on the hub 11. One of their ends of the spring 12 is affixed to the toothed wheel 10, via a hole in said wheel and the other end of said spring is affixed to the disc 8 via a hole in each disc. Thus the movement is transmitted to the toothed wheel 10 with a preadjusted torque, determined by the initial tension of the spring 12. The toothed wheel 6 meshes with the toothed wheel 13 of the principal component of the control apparatus. The control apparatus comprises a cylindrical casing 14 (FIGS. 2 and 3) which has a closed base end and an open base end. Twelve equiangular spaced spoke portion extensions 15 are formed at the open end of the casing 14. A sleeve 16 extends axially from the closed end of the casing 14 and supports an insulating tube 17. Two collecting rings 18 and 19 are coaxially mounted on the insulating tube 17, in cooperation with brushes 20 and 21 (FIG. 1).

A core 22 is coaxially mounted in the casing 14. A disc 23 extending axially from the core 22 is provided with an annular groove and a plurality of balls 24 are positioned and freely movable in said groove. An induction coil 25 is coaxially positioned on the core 22, said coil 25 being connected electrically at its internal end to one collecting ring 18 and at its external end to the other collecting ring 19. The whole unit is rotatably mounted by the shaft 26. The core 22 and the cylindrical casing 14 function as the magnetic circuit of the induction coil 25. The induction coil 25 and a suitable condenser 27 connected via the brushes 20 and 21 form a tuned circuit of a simple oscillator. This oscillator supplies the required power to the synchronous motor 2 at the required frequency.

The toothed wheel 10 meshes with another toothed wheel 28, which simultaneously engages with the pinion 29 of an escapement 30. The escapement 30 is provided with a regulating lever 31 serving for an optimum adjustment of its movement. The toothed wheel 28 (FIGS. 4 and 5) has or is affixed to a spoke wheel portion 32 having twelve radially extending spokes of magnetically conductive material. The whole is supported in rotary fashion by the stable shaft 26 and represents an auxiliary element or component of the control apparatus. The transmission ratio of the pair of toothed wheels 6 and 13 is equivalent to the transmission ratio of the second pair of toothed wheels 10 and 28. The relative radial position of both elements or components of the control apparatus supported in rotary fashion on the same shaft 26 is of course concentric and their mutual axial distance is determined by the channel-positioned balls 24.

The described arrangement operates as follows. The simple electrical oscillator (not shown in detail) drives the synchronous motor 2. The pinion 1 of the motor 2 turns the second pinion 5 via the intermediate toothed wheel 3 and thus also turns the toothed wheel 6 and the disc 8 which is formed as part of or is affixed to said wheel 6. The disc 8 transmits its motion to the toothed wheel 10 via the helical spring 12. The toothed wheel 10 rotates on the intermediate shaft 9 and acting as a flexible coupling, it drives the pinion 29 of the escapement 30 via the toothed wheel 28 with a prior-adjusted torque. The pinion 29 of the escapement 30 simultaneously determines the rotating speed of its own drive. Thus the toothed wheel 28 and the integral or affixed spoke wheel 32, rotates as an auxiliary element of its own control apparatus on the stable shaft 26 with a constant angular speed and represents a comparative time base of the whole arrangement.

The toothed wheel 6, transmitting the rotary motion to another toothed wheel 13, simultaneously drives the principal element or component of the control apparatus which is integral with or affixed to the wheel 13, and which rotatates axially about the stable shaft 26. The transmission ratio of both toothed wheels 6 and 13 is equivalent to the transmission ratio of the other toothed wheels 10 and 28.

In the event that the electrical oscillator (not shown) causes the rotation of the synchronous motor 2 with a current of the proper frequency, the principal element of the control apparatus rotates at the same angular speed as its auxiliary element which is controlled by the balance wheel of the escapement 30. During this time period, the relation of both elements of the control apparatus remains the same and the spoked wheel 32 remains in a position in which its spokes (FIG. 6) are displaced in the clockwise direction of the arrow for half their width relative to the spoke portion extension 15 of the cylindrical casing 14 width. The two elements are thus at the center of the regulating range where the lines of magnetic force pass, that is, in a position corresponding the mean value of passage of the lines of magnetic force. They determine the inductivity of the coil 25, by which the required frequency of the simple electrical oscillator is tuned. The described condition of course does not change as long as the oscillator frequency remains within the limits of accuracy of the balance wheel of the escapement 30.

If for any reason the frequency of the simple electrical oscillator varies, the speed of the synchronous motor 2 varies proportionally, and the theretofore coincident angular speed of both elements of the control apparatus becomes non-coincident. If the frequency is reduced, the speed of the toothed wheel 13 is reduced and thus also the speeed of the principal component of the control apparatus is reduced. Contrary to that, the auxiliary component of the control apparatus rotates without regard to variations of frequency at a constant speed determined by the escapement 30. Thus, the circumferential spoke portion extensions 15 of the casing 14 start to lag relative to the spokes of the spoked wheel 32. The reduction of frequency thus reduces the passage of the lines of force of the magnetic circuit so that the inductivity of the coil 25 decreases. When the inductance 25 decreases, the frequency of the oscillator commences to increase until the angular displacement of both components of the control apparatus is eliminated.

If the frequency of the electrical oscillator increases, the speed of the toothed wheel 13, and thus also of the principal component of the control apparatus is increased and the circumferential spoke portion extensions 15 of the casing 14 start to overtake the spokes of the spoked wheel 32. The passage of the lines of force of the magnetic circuit increases so that the inductivity of the coil 25 increases. When the inductance 25 increases, the frequency of the oscillator commences to decrease until the difference in angular speeds and the angular displacement of both components of the control apparatus is eliminated.

The frequency of the simple electrical oscillator is thus translated to a mechanical movement of the synchronous motor 2 and produces two independent, continuous and mutually concentric motions of two components of the control apparatus. The rotation of the principal component is a direct result of the frequency, whereas the rotation of the auxiliary component, transmitted via the resilient clutch 12, is controlled by the escapement 30 and represents the time base of the arrangement. The frequency is therefore automatically checked by a systematic comparison of the rotation of both components, and the slightest difference in speed or displacement of said components produces a proportional variation in the magnetic reluctance or resistance. The magnetic reluctance variation is translated to a variation in inductivity which eliminates the frequency variations by instantaneous action.

The spring 12, which transmits a practically constant torque to the escapement 30, serves to equalize mechanical actions of slight variability of the automatically checked frequency. The sensitivity of the regulation rapidly eliminates frequency variations of oscillators which could not otherwise be utilized and stabilizes such oscillators within the range of accuracy of the escapement utilized. A rather inexpensive escapement with an accuracy of $1.10^{-4}$ may be utilized for the aforedescribed control and the requirements may be raised in standard, if necessary to a chronometric escapement of an accuracy of $2.10^{-6}$.

The arrangement of the present invention is a simple, inexpensive and completely reliable low frequency generator, which is devoid of frequency dividers. The synchronous motor 2 may, by suitable transmission gears, drive not only clock hands, but may also drive cams for the transmission of minute, half minute or second pulses. The arrangement of the present invention may thus function as a master clock, capable of driving a pulse or frequency system of coupled subsidiary clocks as described with reference to FIGS. 7 to 13.

The pinion 1 of the synchronous motor 2 meshes with the toothed wheel 3 which is affixed to and rotates the auxiliary shaft 4. A pair of cams 33 and 34 (FIGS. 12 and 13), which cooperate with changeover switches 35 and 36 to provide pulse transmitters, and a pinion 37 are also affixed to the shaft 4. The operative notches of the cams 33 and 34 are displaced 180° from each other. The pinion 37 meshes with a toothed wheel 38 which is affixed to and rotates the shaft 39. A small rotating disc 40 is affixed to the shaft 39 (FIGS. 8, 9, 10, 11) and is provided with a moving bolt 41.

Two substantially L-shaped levers 42 and 43, symmetrically positioned with respect to the plane of symmetry 44, are positioned in a plane parallel to the plane of the disc 40. The levers 42 and 43 are pivotally mounted on stable posts 45 and 48, respectively and are secured in axial position by locking rings 47 and 46, respectively. Both levers 42 and 43 cooperate with the control bolt 49 of the regulating lever 50 of the escapement 51. The control bolt 49 is affixed to the regulating lever 50 in a manner not indicated in detail in the figures so that it may be adjusted from its position at the extreme end of said lever, to the position indicated in FIG. 7 by broken lines. Both levers 42 and 43 are normally positioned by springs 52 and 53 and stop bolts 54 and 55.

The operating position of the levers 42 and 43 is determined by the position of the moving bolt 41 of the rotating disc 40 under the control of a pair of electromagnets 56 and 57. In order that the teeth of the pinion 37 remain in constant engagement with the teeth of the toothed wheel 38, even when the moving bolt 41 of the rotating disc 40 is controlled by the operation of both levers 42 and 43, the rotation of the shaft 39 is braked. The arrangement further comprises a pair of switches 58 and 59 for the control signal.

The remote control is effected by a 1000 cycle per second wireless receiver and a time signal analyzer, as described in Czechoslovakian patent Application No. 158,837.

The described arrangement operates as follows. The synchronous motor 2 is driven by a simple electrical oscillator (not shown). The frequency of the oscillator is stabilized by the regulation provided by the advantageous cooperation with an escapement, as hereinbefore described. The arrangement thus provides a simple, inexpensive and completely reliable low frequency generator, devoid of frequency dividers. Any number of synchronous motors, rotating exactly at the same speed as the synchronous motor 2, may be driven by utilizing a suitable amplifier or amplifiers. The synchronous motors provide a silent system of subsidiary frequency driven clocks.

The pinion 1 of the synchronous motor 2 drives the toothed wheel 3 which rotates the auxiliary shaft 4. The cams 33 and 34 and the pinion 37 are rotated by shaft 4. The speed of rotation of the shaft 4 is determined by the selected transmission ratio. If, for example, the cams 33 and 34 are rotating at an angular speed of one revolution per two seconds, their symmetrically positioned operative notches (see FIGS. 12 and 13) influence the corresponding switches 35 and 36 so that in their function as a pulse transmitter they drive the subsidiary clocks by regularly varying the direction of current at intervals of one second. The number of such pulse transmitters, limited only by the torque of the synchronous motor 2, determines the number of directly controlled subsidiary clocks without the use of auxiliary relays. The described arrangement thus provides a system of subsidiary pulse clocks, driven in accordance with the selected transmission at optional intervals. The electrical oscillator thus functions as a master clock.

Since the drive of both coupled systems is determined by the frequency of the simple electrical oscillator, via the common driving element, the rotation on motion of both systems must be coincident. The accuracy of the time depends of course upon the frequency stability of the oscillator, which is controlled by the escapement. In the given example, the frequency stability depends upon the degree of accuracy of the escapement 51 (FIGS. 7 to 11) the deviations of which cannot be eliminated. The oscillator is therefore regulated by an arrangement which operates as follows.

The toothed wheel 38 driven by the pinion 37 rotates the shaft 39 and the disc 40 affixed thereto (FIG. 8) in the direction of the indicated arrow. The disc 40 rotates at a suitably selected transmission ratio such as, for example, at an angular speed of one revolution in three seconds. The position of the disc 40 is adjusted so that the center of the moving bolt 41 moves into the axis of symmetry 44 the sixtieth minute of each hour. Since both layers 42 and 43 are in their neutral positions during the period between the remote control executed for example, each six hours they do not obstruct the moving bolt 41. The neutral positions of the levers 42 and 43 are determined by the stop bolts 54 and 55.

One minute prior to the expected remote control, one of the shafts of the apparatus operates the two switches 58 and 59 via a transmission (not shown). These switches close their contacts for a prior adjusted contact time and switch on the wireless receiver and the analyzer of time signals which are described in the Czechoslovakian patent Application No. 158,837.

Figure 8:
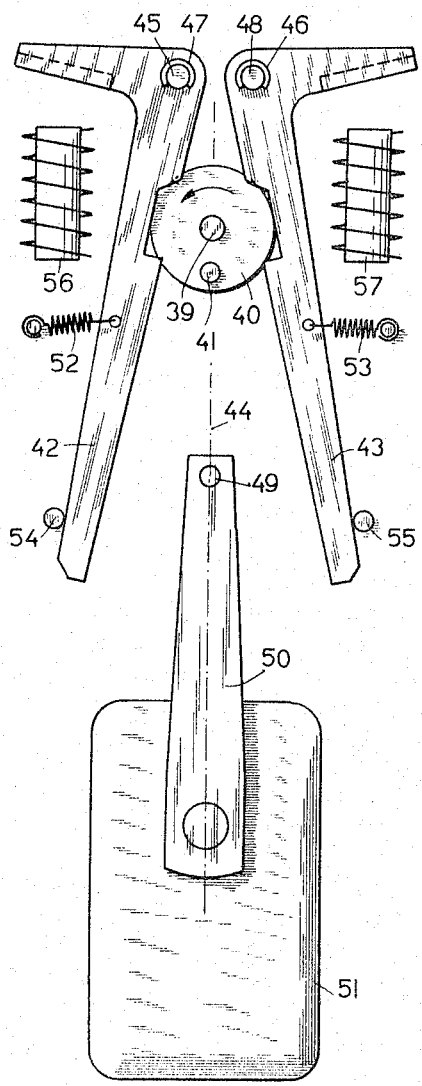
FIGS. 8, 9, 10 and 11 are views of the regulating apparatus of the modification of FIG. 7 in different operating positions.
Figure 9:
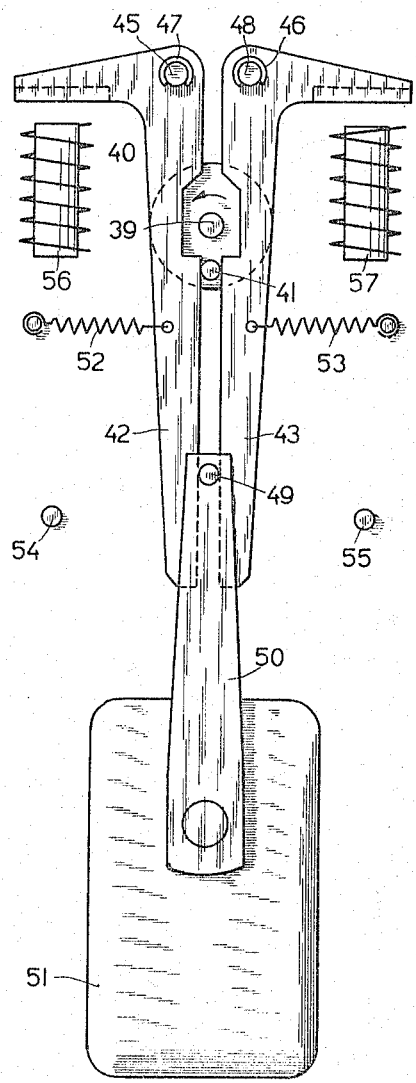
Figure 10:
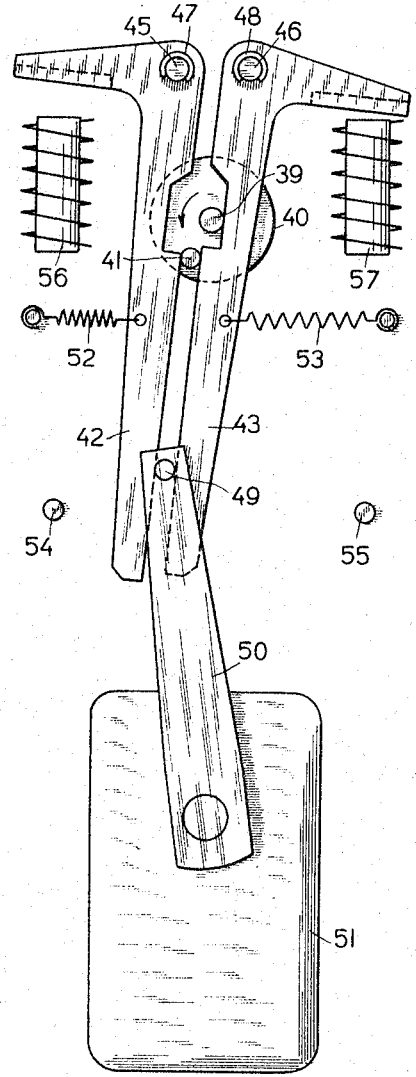
Figure 11:
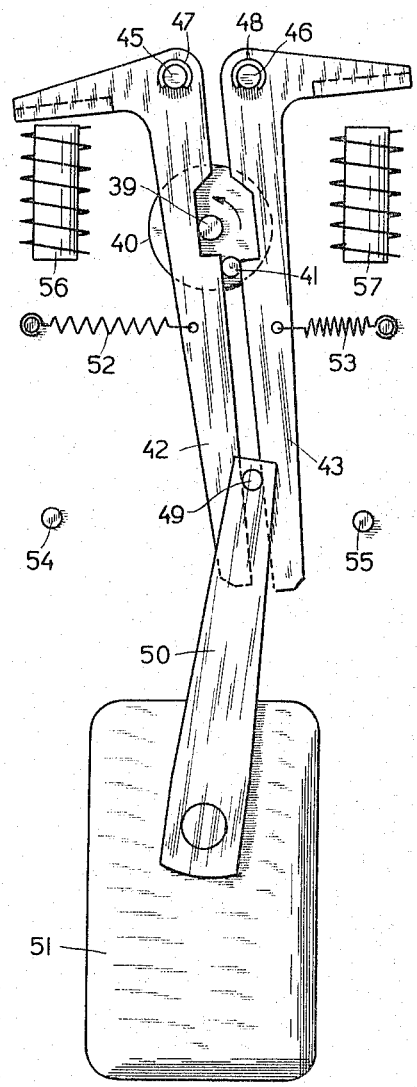
Figure 12:
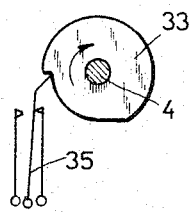
FIGS. 12 and 13 are views, partly in section, of the pulse transmitting component of the modification of FIG. 7.
Figure 13:
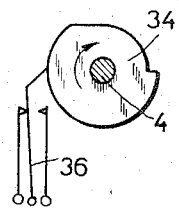

Suppose that the master clock apparatus is correct and the regulating lever 50 of the escapement 51 is in its middle position (FIG. 8). The moving bolt 41 of the rotating disc 40 is exactly in the axis of symmetry 44 precisely at the moment that current corresponding to the last element of the wireless time signal flows through the energizing coils of the electromagnets 56 and 57. Both levers 42 and 43 are attracted by the energized electromagnets and are moved in contact with the moving bolt 41 of the rotating disc 40 (FIG. 9). The ends of the levers 42 and 43 clamp the control bolt 49 of the regulating lever 50 of the escapement 51. In the present example the position of the regulating lever 50 is not varied by this operation and the relatively accurate motion of the escapement 51 is maintained.

If the master clock is slow, the rotating disc 40 is also slow. In such a case, the last element of the time signal energizes the electromagnets 56 and 57 and the attracted levers 42 and 43 contact the moving bolt 51 before it has reached the position corresponding to the correct time. Due to its deviation (FIG. 10), the lever 43 abuts the control bolt 49 and presses said bolt against the other lever 42. This produces a deviation of the regulating lever 50 in accordance with the magnitude of the deviation of the lever 43. The deceleration which caused the slow operation of the clock is thus compensated by a corresponding acceleration of the motion of the escapement 51 approximately up to the subsequent remote control.

If the master clock is fast, the rotating disc 40 is also fast to the same extent. The last element of the time signal energizes the electromagnets 56 and 57 and the attracted levers 42 and 43 contact the moving bolt 41, which has already passed the position corresponding to the correct time. Due to its deviation (FIG. 11) the lever 42 abuts the control bolt 49 and presses said bolt against the other lever 43. This produces a deviation of the regulating lever 50 in accordance with the magnitude of the deviation of the lever 42, but in the opposite sense. Thus the acceleration which caused the fast operation of the clock is compensated by the corresponding deceleration of the motion of the escapement 51 approximately up to the subsequent remote control. The required time can be easily adjusted or varied within a certain range by shifting the control bolt 49. Thus, the angle at which the regulating lever 50 is deviated is increased or decreased.

The frequency stabilizer of low frequency electrical oscillators provided with a periodic correction of the frequency by variation of the motion of its escapement in accordance with the remote control of a time signal functions to reduce any frequency deviations until it quite automatically determines the optimum position of the regulating lever 50. The frequency stabilizing apparatus of the present invention thus maintains a frequency corresponding to the normal time and functions as a simple and small master clock, capable of driving a number of coupled pulse or subsidiary frequency clocks both on stable supports and on moving objects.

The apparatus of the present invention thus successfully varies the frequency of a simple electrical oscillator until its mechanical response coincides exactly with the accurate time, regardless of the character and magnitude of the deviation.

I claim:

1. Apparatus for stabilizing a low frequency electrical oscillator having a tuning circuit for varying the frequency thereof, said apparatus comprising:
    a magnetic circuit having a magnetic reluctance, said magnetic circuit being connected in the tuning circuit of said oscillator as an inductance;
    means for varying the magnetic reluctance of said magnetic circuit upon deviation of the frequency of said oscillator thereby varying the inductance of the tuning circuit of said oscillator to vary the frequency of said oscillator to correct the deviation thereof.

2. Apparatus as claimed in claim 1, further comprising an escapement having a time indicating component, and wherein said magnetic circuit comprises a pair of rotatable components rotatably mounted in cooperative relation with each other, first coupling means for driving one of said rotatable components substantially proportionally with the frequency of said oscillator, elastic coupling means coupling said first coupling means to the other of said rotatable components for elastically driving said other of said rotatable components and second coupling means coupling the time indicating component of said escapement to said other of said rotatable components.

3. Apparatus as claimed in claim 1, further comprising control means adapted to be controlled by time pulses indicating the correct time, said control means being coupled to the time indicating component of said escapement for adjusting said time indicating component in accordance with said time pulses.

4. Apparatus for stabilizing a low frequency electrical oscillator having a tuning circuit for varying the frequency thereof, said apparatus comprising:
    a rotatably mounted coil;
    a magnetic casing enclosing said coil, said casing having an axis and an open base end with a plurality of spoke portion extensions formed at said open base end and extending inwardly toward said axis;
    a spoked wheel rotatably mounted coaxially with said magnetic casing and coplanarly with the extensions of said casing, said spoked wheel having a plurality of spokes extending radially outwardly from said axis and ending short of said extensions of said casing;
    a synchronous motor adapted to be energized by said oscillator;
    first coupling means substantially directly coupling said synchronous motor to one of said coil and said spoked wheel;
    elastic coupling means elastically coupling said synchronous motor to the other of said coil and said spoked wheel;
    an escapement having a time indicating component; and
    second coupling means coupling the time indicating component of said escapement to said other of said coil and said spoked wheel, said coil being connected in the tuning circuit of said oscillator for varying the frequency of said oscillator to correct a deviation of said oscillator by variation of the inductance of said coil upon variation of the magnetic reluctance of said casing upon deviation of the speed of said synchronous motor due to deviation of the frequency of said oscillator.

5. Apparatus as claimed in claim 4, wherein the spoke portion extensions of said casing are equiangularly spaced from each other and the spokes of said spoked wheel are equiangularly spaced from each other.

6. Apparatus as claimed in claim 4, wherein said first coupling means substantially directly couples said synchronous motor to said coil and said elastic coupling means elastically couples said synchronous motor to said spoked wheel.

7. Apparatus as claimed in claim 4, wherein said elastic coupling means includes a coupling link comprising a helical spring.

8. Apparatus as claimed in claim 4, wherein said escapement comprises a balance spring for controlling the time indicating component thereof and a regulating lever cooperating with said balance spring for adjusting the operating length of said balance spring and thereby said time indicating component, said apparatus further comprising control means adapted to be controlled by time pulses indicating the correct time for controlling the position of said regulating lever in accordance with said time pulses to adjust said regulating lever and therefore said time indicating component in accordance with said time pulses.

9. Apparatus as claimed in claim 8, wherein said apparatus further comprises a shaft driven by said synchronous motor, and said control means comprises a disc mounted on and rotatable with said shaft, a bolt affixed eccentrically to and extending from said disc, a pair of independent pivotally mounted levers spaced from each other and movable into and out of engagement with said bolt and with the regulating lever of said escapement, said pair of levers being mounted to clamp said bolt between them, and electromagnetic means in operative proximity with said levers controlling said levers for clamping said bolt between them at determined intervals and for clamping said regulating lever between them at determined intervals and for thereby controlling the position of said regulating lever, said electromagnetic means being adapted to be energized by time pulses indicating the correct time to adjust said regulating lever and therefore said time indicating component in accordance with said time pulses.

No references cited.

STEPHEN J. TOMSKY, *Primary Examiner.*

RICHARD B. WILKINSON, GERALD F. BAKER,
*Examiners.*

L. MICHAEL LORCH, *Assistant Examiner.*